United States Patent [19]
Gaudy

[11] 3,854,619
[45] Dec. 17, 1974

[54] TRANSFERABLE CARGO CONTAINER

[76] Inventor: Oliver M. Gaudy, 2466 E. Sammamish Rd. North, Redmond, Wash. 98052

[22] Filed: May 10, 1973

[21] Appl. No.: 358,888

[52] U.S. Cl. ................ 220/1.5, 214/10.5 R, 108/55
[51] Int. Cl. .......................... B65j 1/00, B65d 19/00
[58] Field of Search .......... 220/1.5, 4, 6, 23.6, 23.4, 220/23.2, 97 R, 97 D, 97 C; 214/6 P, 10.5 R, 214/38 D, 392, 394, 396; 108/48, 52, 53, 55, 108/59, 60

[56] References Cited
UNITED STATES PATENTS

| | | | |
|---|---|---|---|
| 3,233,753 | 2/1966 | Rich | 214/10.5 R |
| 3,587,900 | 6/1971 | Millar et al. | 220/1.5 |
| 3,646,609 | 2/1972 | Bodenheimer | 200/1.5 |
| 3,784,054 | 1/1974 | Mautz | 220/1.5 X |
| 3,797,691 | 3/1974 | Williams | 220/1.5 |
| 3,799,383 | 3/1974 | Gerhard | 220/1.5 |
| 3,802,357 | 4/1974 | Shahani | 108/55 |

*Primary Examiner*—Donald E. Watkins
*Attorney, Agent, or Firm*—Graybeal, Barnard, Uhlir & Hughes

[57] ABSTRACT

An open sided, open top cargo container for highway, railroad or ocean transport of cargo, the container being adapted to have cargo secured thereto and also covered as necessary to be held secure and protected from the rigors of travel and from the elements. The container is adapted to be transferred with its load from one vehicle to another, as from a truck trailer to an ocean going ship. The cargo container comprises a main centrally located longitudinal load carrying beam, extending the full length and reaching the full height of the cargo container. A load carrying framework is cantilevered laterally outwardly in opposing directions from the lower portion of the main beam. There are two end walls at opposite ends of the main beam, and a pair of laterally spaced longitudinal stiffening members for the cantilevered framework. The cargo load is placed on the lower framework between the end walls with the vertical loads from the cargo being transferred through the cantilevered framework into the main center beam. The vertical web portion of the main center beam both provides a centering function to maintain the load in proper position, and interconnects the widely spaced upper and lower flange portions of the main center beam in load bearing relationship.

7 Claims, 4 Drawing Figures

3,854,619

TRANSFERABLE CARGO CONTAINER

BACKGROUND OF THE INVENTION

1. Field of the Invention

The present invention relates to transferable cargo containers, such as those containers which can be transferred with their cargo from one vehicle to another, such as between a truck trailer and an ocean going vessel.

2. Description of the Prior Art

One means of shipping commodities such as lumber is to initially load the lumber onto a large container, with the container itself being transferable with the cargo. By so shipping the container and its cargo as a unit from one carrying vehicle to another there is a substantial savings in avoiding rehandling and restacking the cargo.

A common prior art container for such use is a flat rack container, which comprises essentially a lower load carrying platform and two end walls. When the container and its cargo is being transferred, a lifting beam is attached to the top corners of the two end walls to apply lifting forces thereto, and the container with its cargo is lifted and moved in this manner to another location. With the cargo evenly loaded on the platform the resultant downward force component of the load is exerted at the middle of the platform. With the over all length of the container being as great as for example between 20 and 40 feet, there are exerted on the platform substantial bending moments generated by the lifting forces at the two ends of the container and the downward force of the load on the platform. Because of this, the platform itself must be reinforced with rather substantial longitudinally extending beams. Since the height of the web portion of the beam is proportional to the capability of the beam to withstand bending moments, this usually requires the vertical dimension of the platform framework to be greater than desired, with respect to providing as much cargo carrying space as possible within the over all dimensions of the container and cargo as a unit.

The following three patents are generally representative of such prior art transferable containers: Coe, U.S. Pat. No. 1,777,394; Whittle, U.S. Pat. No. 3,216,585, and Lancashire, U.S. Pat. No. 3,580,403. Halvorsen et al, U.S. Pat. No. 3,170,723, is representative of the teaching as to the manner in which bending moments are imposed on a conventional I beam.

In view of the foregoing, it is an object of the present invention to provide an improved transferable cargo container, having desirable characteristics with regard to such features as volume of cargo space, effective cargo loading and positioning, structural integrity, and small deflection under loading.

SUMMARY OF THE INVENTION

The present invention comprises a transferable cargo container defining a cargo carrying space, and having a main load carrying longitudinally extending, centrally located, vertically oriented beam arranged to take the main vertical loads exerted by the cargo on said container. A cargo carrying platform framework is mounted from the lower portion of said beam, in a manner as to be cantilevered outwardly therefrom in laterally opposing directions. The vertical loads from the weight of the cargo are transmitted through the platform framework laterally into the main central beam. The main beam reaches vertically to the height of the cargo space defined by the carrier, with a vertical web of the main beam providing a center partition for properly positioning the cargo loaded on the carrier.

With the main longitudinal bending moments being taken in the center beam, the cargo supporting platform can be made relatively shallow since the loads therefrom are transferred only a short distance laterally into the center beam. This provides greater volume of loading capacity within the limitations of over all exterior dimensions of the container. Further, with the web of the main beam extending the full height of the cargo carrying space, the main center beam is better able to withstand the substantial bending moments imparted by the cargo load, and would be subject to less vertical deflection under loading to facilitate vertical stacking of containers. The vertical web of the main beam, in addition to providing its beam function of interconnecting the upper and lower beam flanges in load bearing relationship, serves as a cargo partition to properly position the cargo. This not only facilitates loading, but reduces strain on the cargo securing straps or other securing means, such strain occurring, for example, from the roll of a ship where the containers are stowed in fore and aft position. The container with its cargo can be loaded onto a railroad car or marine transport vessel with or without a highway trailer, thus being suitable for present day transport as "roll on/roll off" while attached to a trailer, or as "pure containers" if detached from the trailer aboard the vessel. Other features of the invention will become apparent from the following description.

DESCRIPTION OF THE PREFERRED EMBODIMENT

Figure 1:
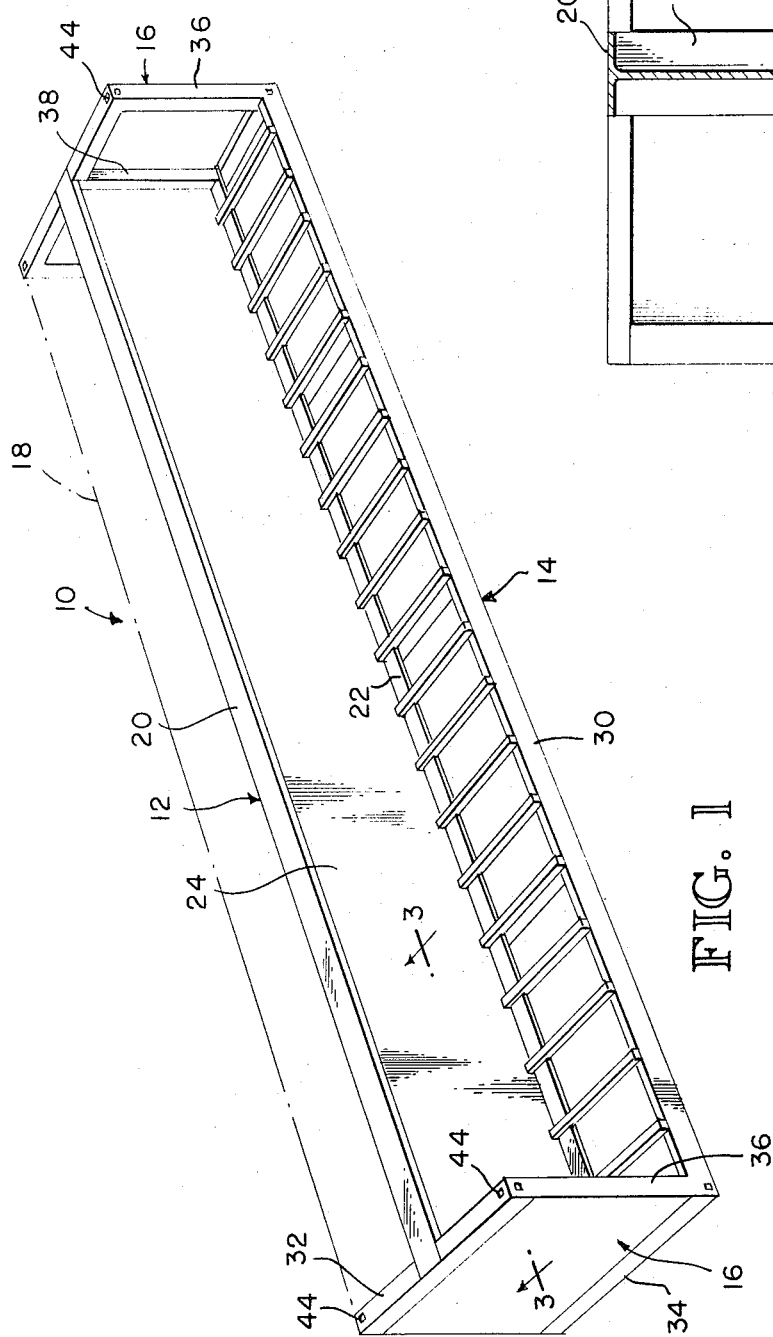
FIG. 1 is a perspective view of the cargo container of the present invention.
Figure 2:
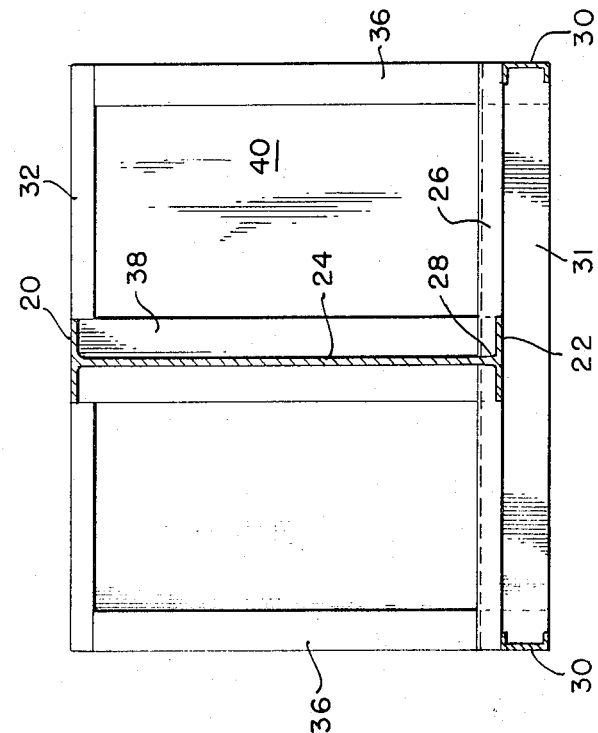
FIG. 2 is a transverse sectional view of the container, taken at a location along the mid-length thereof.
Figure 3:
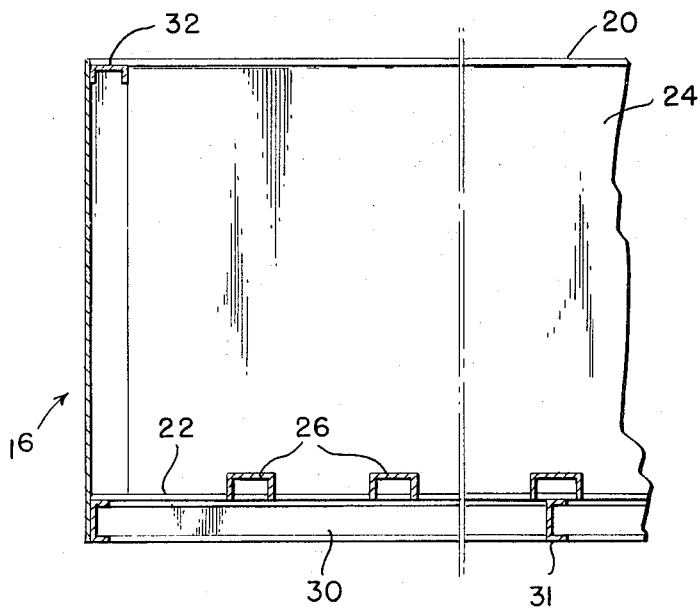
FIG. 3 is a longitudinal sectional view taken at 3—3 of FIG. 1.

With reference to the accompanying drawings, the cargo container of the present invention, generally designated 10, comprises a main longitudinal center beam 12, a lower cargo supporting framework 14, and a pair of end walls 16. The cargo or load, a part of which is indicated in FIG. 1 at 18 by means of a dotted line, is loaded between the two end walls 16 onto the lower frame 14, on opposite sides of the center main beam 12. The cargo 18 is secured to the container 10 by suitable means such as straps extending laterally around the container 10 and cargo 18, so that the container 10 with the cargo 18 can be transferred as a unit from one carrying vehicle to another. In the following description, the container 10 will be described with reference to carrying lumber as a typical cargo, although the invention is obviously not intended to be limited to that application.

The main center beam 12 extends the length of the cargo container 10 and reaches the full height thereof. The beam 12 as shown herein has the conventional configuration of an I-beam and comprises an upper flange 20, a lower flange 22, and an interconnecting web member 24. While the web 24 is shown as a flat plate extending the full length and height of the beam 12, it is to be understood that the web 24 in performing its load positioning function and the function of interconnecting the upper and the lower flanges 20 and 22 in load bearing relationship, can have other configurations known in the art, such as a diagonal arrangement of interconnecting struts.

The cargo carrying framework or platform 14 comprises a plurality of oppositely extending secondary cross beams 26, each supported from its inner end by the lower portion of the main center beam 12 and rigidly connected thereto. In the specific configuration shown herein, each of these beams 26 is in the form of a down turned channel member, with its inner end resting on a related side portion of the lower main beam flange 22 and reaching outwardly therefrom. Extending the length of the container 10 along opposite sides thereof just below the outer ends of the two sets of secondary cross beams 26 and connected thereto, are two longitudinal stiffening beams 30 connected at their ends to the end walls 16. At intervals along the length of the framework 14, there are several transverse beams 31 extending in cantilevered fashion from the main center beam 12, each beam 31 being supported at its center portion from the lower flange 22. The specific configuration of these beams 26, 30 and 31 can be modified in various ways known to those skilled in the art. As a further possible modification, the secondary beams 26 could be positioned slightly lower and continuous sheathing secured to the top side of the beams 26.

Each end wall 16 comprises a top, bottom and side frame members, numbered 32, 34 and 36, respectively, and a middle frame member 38, connecting to a related end of the main center beam 12. A panel or sheet 40 for each end wall 16 reaches between its related frame members 32, 34 and 36 to close the ends of the cargo container 10. The side members 36 are load carrying posts which are made sufficiently strong so that containers can be stacked on top of one another, with the vertical loads from the upper containers being transmitted through these posts 36.

The cargo carrying space provided by the container 10 has the ends thereof defined by the two walls 16, the bottom by the lower framework 14, the top by the upper flange 20 and the upper edges of the end walls 16, and its sides generally by the lateral edges of the end walls 16 and lateral edges of the lower framework 14. The vertical web 24 of the main center beam 12 divides this cargo containing space into two side by side sections, with the web 24 performing a positioning function in maintaining the cargo properly located in the cargo carrying space.

In operation, the cargo 18, such as lumber, is loaded onto the lower framework 14. As shown herein, the cargo 18 is indicated as being loaded only on one side of the container 10, it being understood that when the loading is completed, the cargo is loaded on both sides of the container 10. As the cargo is loaded, it is positioned against the vertical web 24, with the web 24 locating the cargo 18 in the container 10. With both sides of the container 10 loaded, the cargo 18 is secured to the container 10 in a conventional manner, such as with straps reaching circumferencially around the cargo 18 and container 10.

Figure 4:
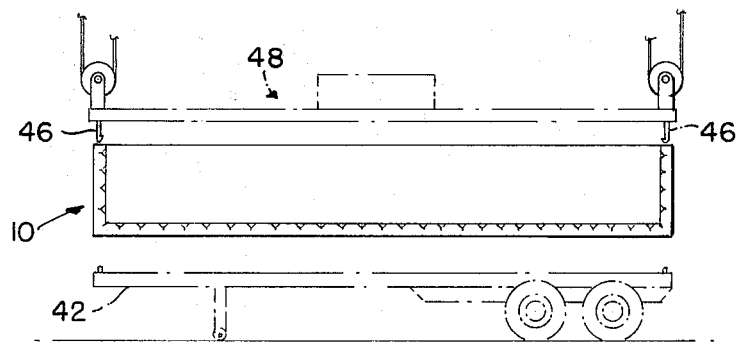
FIG. 4 is a side elevational view showing the container with its cargo being lifted from a trailer.

With reference to FIG. 4, the container 10 with its cargo 18 secured thereto can then be lifted from a truck trailer 42. At the two upper outside corners at each end wall 16, there is a hook, ring or other device, indicated at 44, which can be connected to a respective one of the four lifting latches 46, so that the container 10 with its cargo 18 can be lifted from its four corners 44, as by a lifting beam indicated generally at 48.

Of particular significance in the present invention is the manner in which the force exerted by the weight of the cargo 18 is transferred through the container 10 and into the latches 46. The weight of the cargo 18 is transmitted directly to the secondary beams 26 and the transverse beams 31, all of which are cantilevered from the main center beam 12. These beams 26 and 31 in turn transfer the load laterally into the main center beam 12. The two longitudinal beams 30 provide a stiffening function, and these beams 30 also take some loading from the secondary beams 26 and transmit these loads to the beams 31 and thence into the main center beam 12.

With the container 10 being lifted from its end walls 16, the resultant of the forces exerted by the weight of the cargo 18 is directed downwardly at the mid-section of the main center beam 12, thus creating a quite substantial vertical bending moment thereon. This places the top flange 20 in compression and the lower flange 22 in tension, with the web 24 interconnecting the flanges 20 and 22 in proper force transmitting relationship. Because of the very substantial height of the web 24, the beam 12 is better able to withstand such bending moments with a minimum of vertical deflection.

Further, the web 24 besides functioning as a force transmitting member of the beam 12, serves a locating function for the cargo 18 to keep it properly centered on the container 10. Since the bottom frame 14 does not transmit its primary loads longitudinally out to the end wall 16, but rather a short distance laterally into the beam 12, the height dimension of the framework or platform 14 can be significantly reduced in comparison with prior art devices, thus permitting a greater volume of cargo space for given over all exterior dimensions of the cargo carrier.

What is claimed is:

1. A transferable cargo container capable of being moved as a unit with its cargo from one carrying vehicle to another, such as from a trailer to a ship, said container having a longitudinal axis and a transverse axis and a predetermined length, width and height, said container defining a cargo carrying space having a bottom, top, sides and ends, said container comprising:
   a. a main longitudinally extending vertically positioned beam member located proximate a longitudinal center axis of said carrier, said beam comprising:
      1. an upper longitudinally extending beam portion located proximate the top center of said cargo carrying space to withstand upper beam bending moment forces,
      2. a lower longitudinally extending beam portion located at the bottom center of said cargo carrying space and coacting with said upper beam to withstand lower beam bending moment forces,
      3. a vertical web portion interconnecting said upper and lower beam portions in load bearing relationship and providing cargo center partition means for maintaining cargo in proper position on said container, and b. a lower load supporting framework located at the bottom of said cargo space for cargo support, said framework having a plurality of longitudinally spaced secondary beam means cantilevered from a lower part of said main beam in opposite laterally extending relationship therefrom, in a manner that vertical cargo loads on said secondary beam means are transmitted into said main beam.

2. The container as recited in claim 1, further comprising two longitudinal laterally spaced stiffening beam members secured to opposite outer ends of said secondary beam means to resist secondary forces exerted on said container.

3. The container as recited in claim 1, wherein there are two transversely aligned oppositely positioned end walls connecting to said main beam and defining the ends of said cargo space.

4. The container as recited in claim 3, wherein there are container transferring connecting means at the ends of said container by which said container is lifted, whereby maximum vertical bending moments are transmitted to the middle portion of said main beam.

5. The container as recited in claim 3, further comprising two longitudinally laterally spaced stiffening beam members secured to opposite outer ends of said secondary beam means to resist secondary forces exerted on said carrier.

6. The container as recited in claim 1, wherein said main beam comprises an upper flange member proximate the top of said cargo space, a lower flange member proximate the bottom of said cargo space, and a vertically oriented generally planar web member interconnecting said upper and lower flanges.

7. The container as recited in claim 6, wherein said secondary beam means comprises a plurality of lateral beams positioned on said lower flange so as to be cantilevered outwardly therefrom.

* * * * *